United States Patent
Grossier

(10) Patent No.: US 6,553,478 B1
(45) Date of Patent: Apr. 22, 2003

(54) COMPUTER MEMORY ACCESS

(75) Inventor: Nicolas Grossier, St Georges-de-Commiers (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/561,629

(22) Filed: May 2, 2000

(30) Foreign Application Priority Data

May 3, 1999 (EP) ............................................. 99410064

(51) Int. Cl.[7] ............................................... G06F 12/00
(52) U.S. Cl. ....................... 711/209; 711/157; 711/173; 711/202; 711/211
(58) Field of Search ............................. 711/5, 105, 157, 711/211, 209, 202, 173

(56) References Cited

U.S. PATENT DOCUMENTS

| 5,341,489 A | | 8/1994 | Heilberger et al. | ......... 395/425 |
|---|---|---|---|---|
| 5,483,497 A | * | 1/1996 | Mochizuki et al. | .... 365/230.03 |
| 5,526,506 A | * | 6/1996 | Hyatt | .......................... 711/111 |
| 5,530,837 A | | 6/1996 | Williams et al. | ............ 395/434 |
| 5,579,277 A | * | 11/1996 | Kelly | ..................... 365/189.02 |
| 5,701,434 A | * | 12/1997 | Nakagawa | ................... 711/138 |
| 5,745,913 A | * | 4/1998 | Pattin et al. | ................. 711/105 |
| 5,761,695 A | | 6/1998 | Maeda et al. | ................... 711/5 |
| 6,131,146 A | * | 10/2000 | Aono | ..................... 365/230.04 |

* cited by examiner

Primary Examiner—Reba I. Elmore
(74) Attorney, Agent, or Firm—Wolf, Greenfield & Sacks, P.C.; James H. Morris; Robert A. Skrivanek, Jr.

(57) ABSTRACT

A memory for a computer system that includes a plurality of memory banks which provide an interleaved memory region as well as X and Y memory regions. Each memory access address includes a most significant set of bits indicating which of the interleaved, X, or Y memory regions is to be accessed. Each memory access address also includes a least significant set of bits indicating an address within the bank of the access region. At least one bit in the least significant set is a bank selector and one bit of the most significant set of bits is an X or Y region selector.

10 Claims, 4 Drawing Sheets

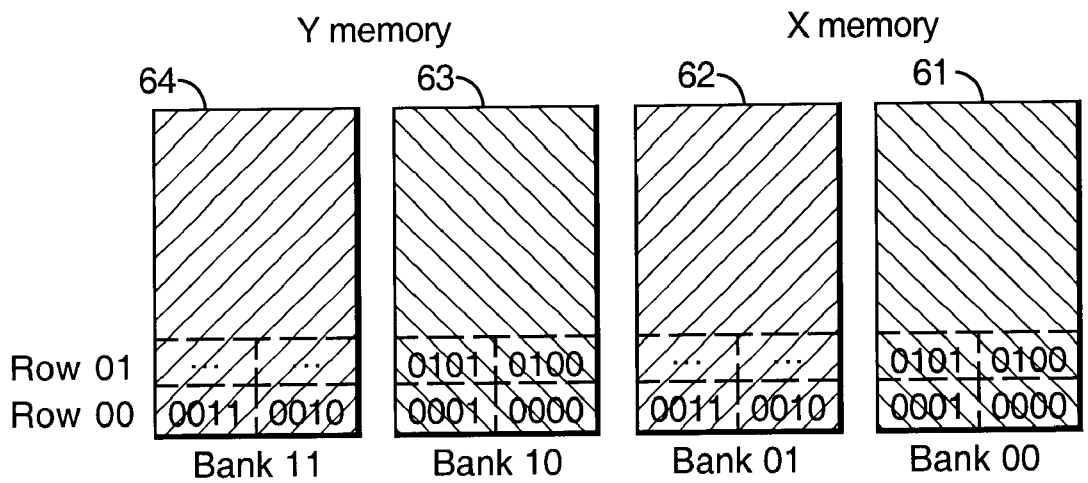
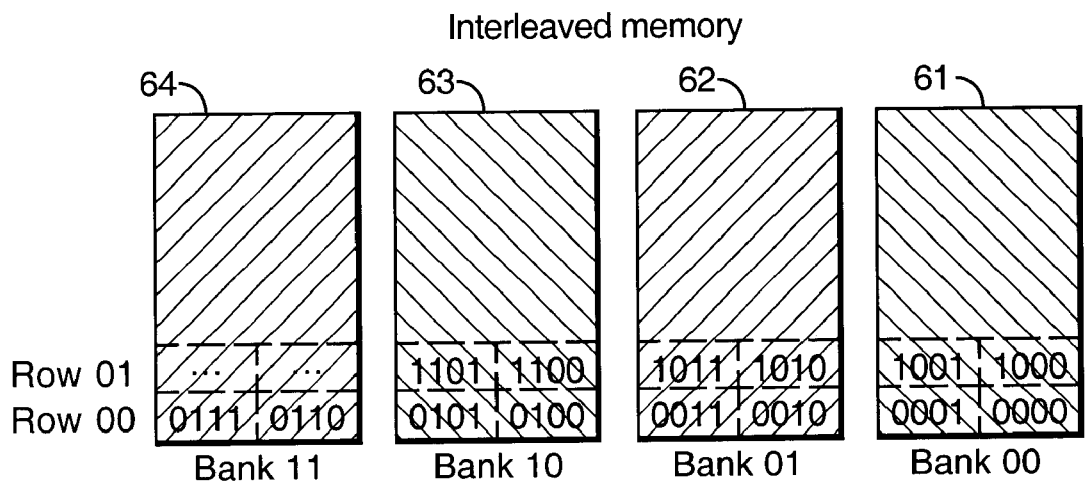

COMPUTER MEMORY ACCESS

The invention relates to circuits and methods for accessing computer memory using X and Y memory addressing as well as interleaved memory addressing.

BACKGROUND OF THE INVENTION

Computer memories are known in which the memory space available is mapped to provide separately addressable regions each of which may be provided by a plurality of memory banks. In the case of an interleaved memory system, data may be located in each of the banks using a common addressing system so that data is located in a new bank address only when each of the bank storage locations has been used for the preceding address. In an X-Y organisation, some of the memory banks form a Y memory region while other memory banks form an X memory region and the two regions are located at different mapped positions within the memory space. In this way, the storage location in the X bank are addressed quite independently of the storage locations within the Y bank.

In some applications, an interleaved organisation of the memory addressing may enable compilers to be more efficient in generating high performance code. On the other hand, some digital signal processing (DSP) applications require an X-Y organisation for specific algorithms.

It is an object of the present invention to provide a computer system in which both types of memory addressing can be employed.

SUMMARY OF THE INVENTION

The invention provides memory circuitry for a computer system having a plurality of memory banks forming at least part of the mapped memory space, a first part of said space providing an interleaved memory region formed by each of said memory banks so that data is stored in each of the banks within the interleaved region, a second part of said space providing an X memory region using only one or some of said memory banks and a third part of said space providing a Y memory region using the or each memory bank not used in the X memory region, each of said interleaved, X and Y memory regions being separately mapped within the memory space, together with circuitry to generate an access address and an indication of whether the access is an interleaved access or an X or Y access, said access address including a most significant set of bits which indicate which of the interleaved, X or Y memory regions is to be accessed, and a least significant set of bits which include an indication of an address within a bank of the accessed region, at least one bit within said least significant set selecting one bank within an accessed region if that region has more than one bank and one bit in said most significant set of bits indicating selectively the X or the Y memory region during an X or Y access, and memory access circuitry arranged to selectively access the memory in response to said access address.

Preferably at least four memory banks are provided, said interleaved region being provided in part by all of said banks, said X region being provided by part of half of said banks, and said Y region being provided by part of the remainder of said banks not used by the X region.

Preferably each of said X and Y regions have two memory banks and each of said interleaved, X and Y regions has a different mapping address within the memory space indicated by some bits in the most significant part of a memory access address.

In one embodiment two of the least significant bits of an access address are used by the memory access circuitry in an interleaved access to identify the memory bank being accessed.

Preferably one of the least significant set of bits of the memory access address is used together with one of the most significant set of bits of the access address to determine which bank is to be accessed during an X or Y access.

Preferably the set of least significant bits includes a set of bank addressing bits of immediately greater significance than the bits forming the bank selection, said bank addressing bits providing an address within the selected bank.

Conveniently said memory access circuitry includes a plurality of multiplexing circuits, one multiplexing circuit selecting from an access address one or more bits to determine which bank is to be accessed and a second multiplexing circuit for selecting other bits from an access address to determine an address within the selected bank.

The invention also provides a method of accessing memory in a computer system comprising defining a plurality of memory banks forming at least part of a map memory space, a first part of said space providing an interleaved memory region formed by each of said memory banks so that data is stored in each of the banks within the interleaved region, a second part of said space providing an X memory region using only one or some of said memory banks, and a third part of said space providing a Y memory region using the or each memory bank not used in the X memory region, each of said interleaved, X and Y memory regions being separately mapped within the memory space, said method further comprising generating a access address including a most significant set of bits which indicates which of the interleaved, X or Y memory regions is to be accessed, and a least significant bit or bits which include an indication of an address within a bank of an accessed region, at least one of said least significant set of bits selecting one bank within an accessed region if that region has more than one bank, and one of said most significant set of bits indicating selectively the X or Y memory region during an X or Y access, and accessing selectively the memory in response to said access address.

Preferably two memory banks are provided for each of said X and Y memory regions and four memory banks are provided for the interleaved memory region, the least significant two bits of the memory address being used to select a bank in an interleaved memory access and the least significant bit being used together with one bit of the most significant set of bits to determine a memory bank during an X or Y memory access.

In one embodiment the bits used to indicate an address within a bank have a bit of greater significance during an interleaved access than the bits used to provide a bank address during an X or Y access, thereby providing a larger range of addresses within a bank during an interleaved access than the range of addresses available during an X or Y access.

BRIEF DESCRIPTION OF THE DRAWINGS

FIG. 2 illustrates an X-Y memory arrangement for use in the apparatus of FIG. 1, FIG. 3 shows an interleaved memory arrangement for use in the apparatus of FIG. 1.

DESCRIPTION OF THE PREFERRED EMBODIMENT

Figure 1:
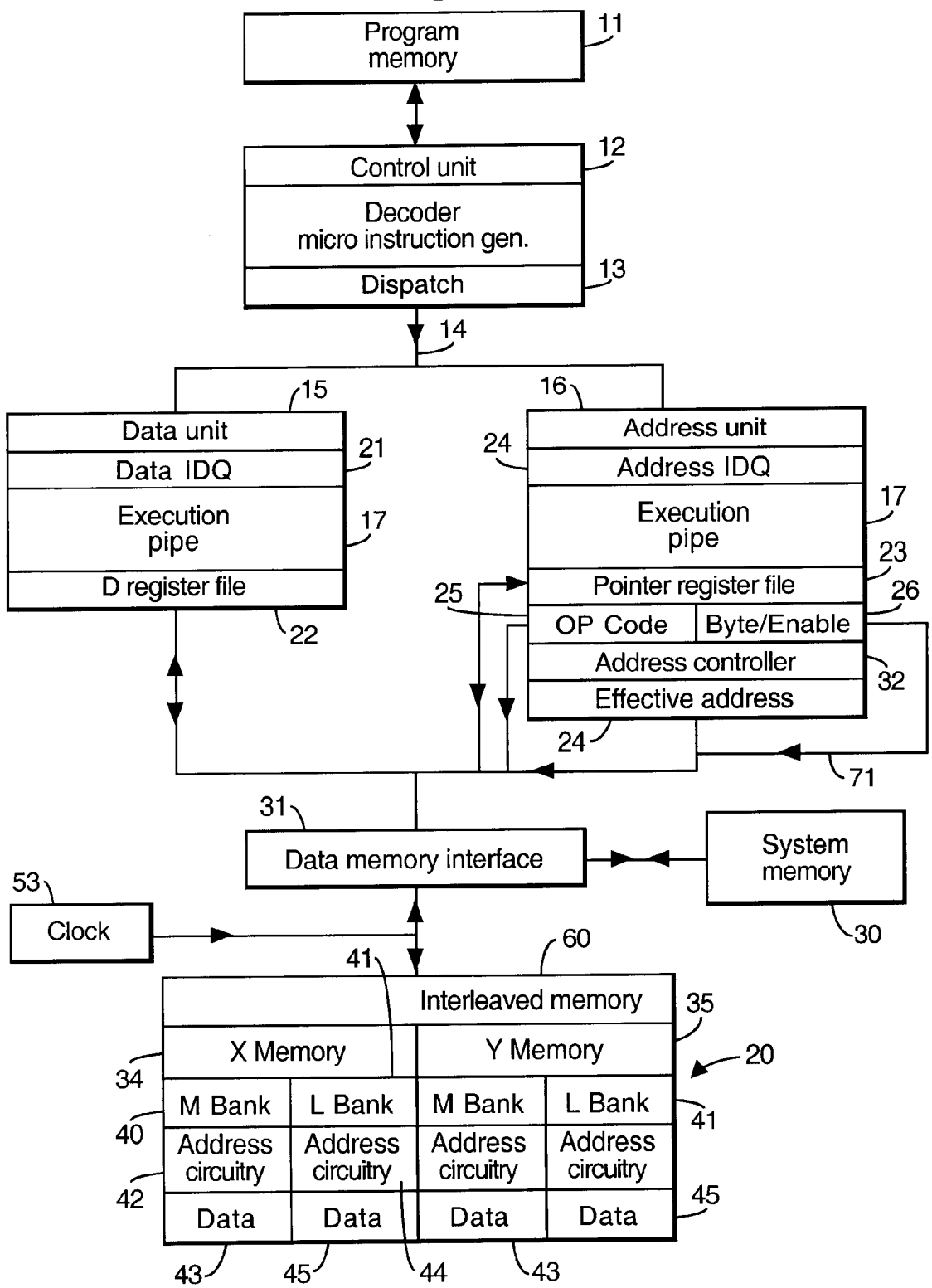
FIG. 1 is a schematic block diagram of a computer system in accordance with the present invention.

The particular example shown in FIG. 1 illustrates a computer system used as a digital signal processor (DSP). Instructions are held in a program memory 11 and fetched by a control unit 12 which includes a decoder as well as a microinstruction generator. The microinstructions are output by a dispatch circuit 13 along line 14 to either a data unit 15 or an address unit 16 coupled in parallel. The data unit 15 and address unit 16 each include an execution pipeline 17 arranged to execute instructions in parallel using a data memory 20. The data unit 15 may itself include two parallel execution pipes receiving instructions from a data instruction queue 21 and accessing a common data register file 22. The address unit 16 may also include two parallel execution pipes accessing a common pointer register file 23 and receiving instructions from an instruction queue 24. Execution of instructions in the address unit will result in the generation of an effective address (EA) 24 for use in memory accessing as well as an OP code 25 and byte enable signals 26 for use in the memory accessing. The effective address is provided as an output of an address controller 32.

By arrangement of the data unit 15 and address unit 16 in parallel, the two units may simultaneously execute instructions thereby providing an access decoupled system providing improved efficiency in data manipulations involving the memory 20. The system may also incorporate an external system memory 30. Both memory 20 and the system memory 30 are coupled to a data memory interface 31. The effective address 24 generated by the address unit 16 may provide access to the system memory 30 or to the local memory 20. Access will be controlled by the memory interface 31.

In this particular case the local memory 20 consists of four banks which provide an interleaved section 60 as well as an X memory 34 and a Y memory 35. The X memory and Y memory are similarly constructed and each consists of an M bank 40 and an L bank 41. The M bank 40 has its own addressing circuitry 42 and a data storage region 43. Similarly the L bank has its own addressing circuitry 44 and its own data storage region 45.

Accesses to the X and Y memories 34 and 35 are controlled by timing signals from a clock 53 coupled to the memory interface 31 and the memory banks so that memory accesses are operated on clocked cycles.

Data is stored in the memory 43 and 45 in bit sequences forming words, each word consisting of a multiple number of 8 bit sequences or bytes. In this particular example the wordlength used is 32 bits but other examples may consist of 16 bits or 64 bits or any other multiple number of bytes for each word.

To achieve effective half word aligned word access, the X memory 34 and the Y memory 35 are each divided into the two banks 40 and 41. Each memory bank provides two bytes (half a word) of memory capacity in each row. To access the memory banks, the address circuitry 42 and 44 of the two memory banks of the same X or Y memory must be provided with the same word address thereby identifying the required row of memory together with the appropriate byte enable signals to select the required byte or bytes from the two memory banks.

In this embodiment the memory space includes an interleaved memory region 60 in addition to the X memory 34 and Y memory 35. These all form separately identified regions of a mapped memory space. The memory access circuitry may operate with interleaved memory organisation which is advantageous for achieving higher efficiency with a compiler which may the generate high performance code. The access circuitry may however access the memory on an XY system which may be advantageous for certain digital signal processing algorithms. FIGS. 2 and 3 illustrate the difference between these two memory accessing systems. Each of FIGS. 2 and 3 illustrates four similar regions of memory space marked 61, 62, 63 and 64. Each of these regions forms an identifiable memory bank, region 61 being identifiable as bank 00, region 62 forms bank 01, bank 63 forms bank 10 and region forms bank 11. In the case of FIG. 2 which operates with X and Y memory regions, bank 00 forms the XL bank, bank 01 forms the XM bank, bank 10 forms the YL bank and bank 11 forms the YM bank. Each of these banks is arranged to hold two bytes in each row. For the X memory, the first two bytes (0000 and 0001 are located in adjacent positions in row 00 of memory region 61). The next two bytes (0010 and 0011) are located in row 00 of memory region 62. The next two bytes (0100 and 0101) are held in row 01 of memory area 61. A similar bytes allocation is provided in the Y memory. The first two bytes (0000 and 0001) are located in row 00 of memory region 63. The next two bytes (0010 and 0011) are located in row 00 of memory space 64. The next two bytes (0100 and 0101) are located in row 01 of memory region 63. In the case of an interleaved arrangement as shown in FIG. 3, the first 8 bytes are located two at a time in row 00 of all four memory regions 61,62,63 and 64. After that further bytes are loaded sequentially into row 01 across the four memory spaces beginning with byte 1000 being the first byte in memory space 61 and the last byte 1111 is held in memory space 64 and so on.

In order to permit either type of memory access to be used, it is necessary for the effective address which is fed to the memory interface 31 from the address unit 16 to be capable of implementing either type of memory access. The effective address which is supplied from the address unit 16 is a 32 bit word of the general type shown at 71 or 72 in FIG. 4. Each of the memory regions is mapped in a common memory space marked 70 in FIG. 4. The X memory region is identified by a pointer 75 addressing the start of the X memory region. The Y memory region 35 is identified by a similar base pointer 76. The interleaved memory region 60 is identified by a base pointer 77. The effective addresses 71 and 72 which are supplied by the address unit 16 include a most significant set of bits 78 which provide a mapping indication to determine the identified region within the memory space 70 which is to be accessed. The bank address within that region is indicated by the least significant bits 79 in the address.

In the case of interleaved access, the most significant bits 78 are used to indicate the required region within the mapped space of memory 70. The variation of map space is indicated by the line 81 in FIG. 4 and in the case of the address word 71 shown at the top of FIG. 4, the mapping bits 78 indicate at pointer 82 that the interleaved region 60 is to be used. Bits 15-3 of the least significant bits 79 indicate a row position within the interleaved memory space 60. The least two significant bits shown are bits 1 and 2 and they identify which bank 00, 01, 10 or 11 is to be used in that row of the interleaved memory space. The address words are 32 bits long and bit 0 which is the least significant bit in each word is used to identify one of the two bytes shown in each bank row of FIG. 2.

In the case of a memory access using the X and Y arrangement, the address from the address unit is indicated at 72 in FIG. 4 and again the most significant bits 78 indicate the general mapping position within the overall memory space 70 and in this particular example bit 20 is selected to identify either the position 90 corresponding to the Y memory or the position 91 corresponding to the X memory. The least significant bits 79 again indicate a row address within the banks and this can of course be the same value for both the X and the Y memory regions and the particular locations selected for access will depend upon the value 90 or 91 determined by bit 20. In this case only bit No 1 is necessary to determine between the M banks or the L banks. If bit number one is 0 then either XL or YL bank will be selected whereas if bit number one is 1 then either XM or YM banks will be selected depending upon mapping position determined by bit 20.

Figure 5:
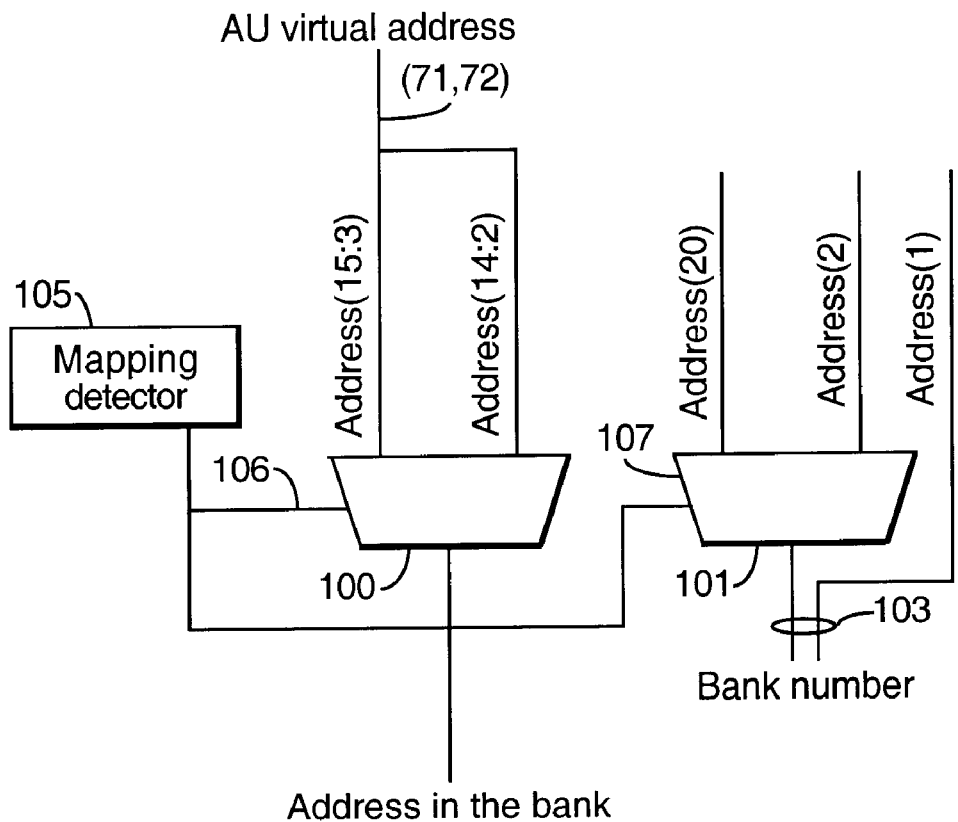
FIG. 5 shows an arrangement of selector circuitry for use within the apparatus of FIG. 1.

In order to achieve this choice of accessing, circuitry as shown in FIG. 5 is used to receive the address words 71 and 72 from the data unit 16.

Figure 4:
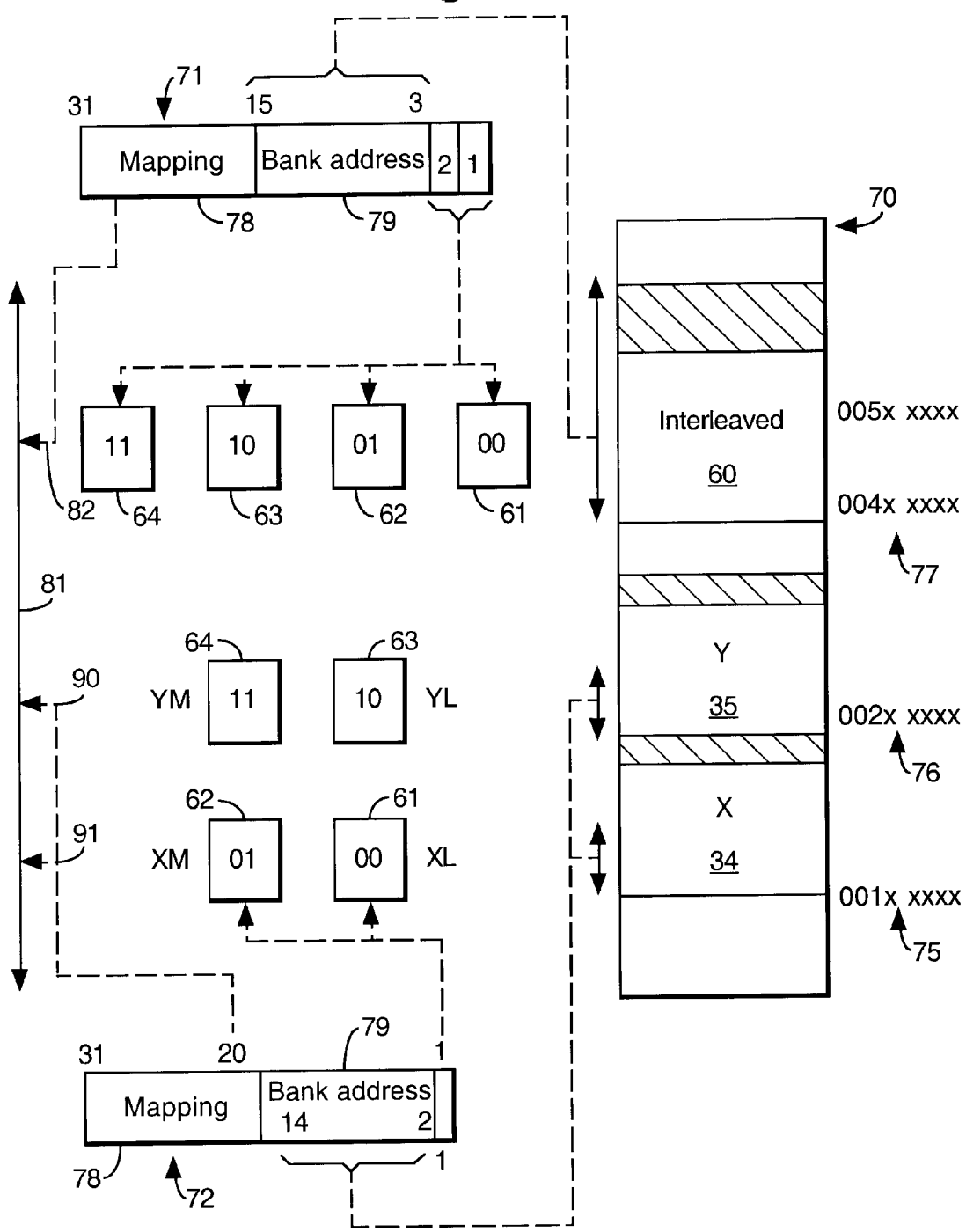
FIG. 4 illustrates how access addresses may be used in the embodiment of FIG. 1.
Figure 6:
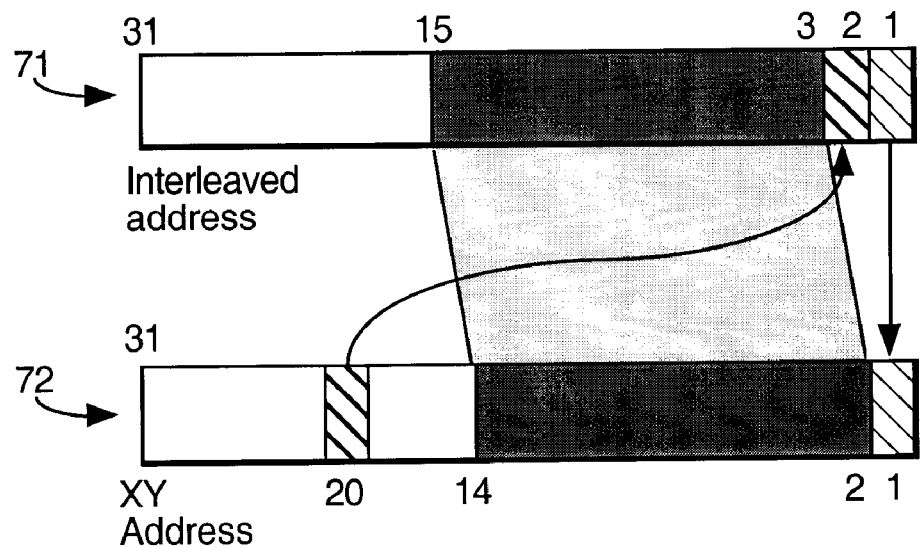
FIG. 6 illustrates the function of the selector apparatus of FIG. 5.

Two multiplexers 100 and 101 are arranged to receive as inputs selected bits from the address word and are operated in response to mapping bit detection to make a selection of bits from the address word. The most significant bits 78 which form the mapping bits shown in the addresses of FIG. 4, are compared with mapping thresholds in a mapping detector 105 as shown in FIG. 5. The mapping bits are compared with the mapping addresses shown for the different memory regions in FIG. 4 to determine whether the address relates to the interleaved region 60 or whether it applies to the X-Y regions 34, 35. If the address is greater than 003FFFFF then the address will be located at or above the pointer 77 in FIG. 4 thereby indicating the interleaved region 60. If the address is less than or equal to 003FFFFF then the X-Y regions are indicated. In order to detect whether the address is less than or equal to 003FFFFF the mapping detector 105 checks bits 31 to 22 of the address words 71 and 72 in FIG. 4 to ensure that they are all 0. If bits 31 to 22 are all 0 then the address will be in the X-Y regions. The mapping detector 105 then outputs appropriate signals on lines 106 and 107 to control the multiplexers 100 and 101. In the case of mapping detection indicating interleaved access, multiplexer 100 selects bits 15-3 of the address word 71 in order to indicate a physical address within one of the four memory banks. Multiplexer 101 will in this situation select bit 2 of the address word for combination with bit 1 to provide an output 103 which indicates one of the four banks identified between 00 and 11. This is illustrated in FIG. 6 whereas bits 15-3 identify a position within a bank and bits 1 and 2 identify which particular bank is to be used. Bit zero will identify a byte location within the bank.

In the case of X and Y memory accessing, mapping detection changes the operation of the multiplexer 100 and 101 so that multiplexer 100 selects bits 14-2 to identify a physical address within a selected memory bank. Multiplexer 101 selects bit 20 to be combined with bit 1 to provide at output 103 a selection of the correct bank from the four available bank numbers. As illustrated in FIG. 6, the X and Y mode uses bit 20 in place of bit 2 in order to identify the correct bank.

It will be appreciated in the above example that in the interleaved mode the address variation within the memory banks is much larger using all addresses identifiable by bits 15-3. In the case of the X and Y accessing the range of addresses in the banks is determined by bits 14-2 thereby making part of the memory bank space redundant.

The invention is not limited to the details of the foregoing example.

What is claimed is:

1. Memory circuitry for a computer system, comprising:
   a plurality of memory banks forming at least part of a mapped memory space of the computer system,
   a first part of said memory space providing an interleaved memory region formed by each of said plurality of memory banks so that data is stored in each of said plurality of memory banks within said interleaved memory region,
   a second part of said memory space providing an X memory region using at least one of said plurality of memory banks, and
   a third part of said memory space providing a Y memory region using each memory bank of said plurality of memory banks not used in said X memory region,
   wherein each of said interleaved memory region, said X memory region and said Y memory region are separately mapped within said memory space;
   circuitry to generate an access address and an indication of whether a memory access is an interleaved access or an X or Y access, wherein said access address includes a most significant set of bits which indicate which of said interleaved memory region, said X memory region or said Y memory region is to be accessed, and a least significant set of bits which include an indication of an address within a memory bank of the accessed memory region, at least one bit within said least significant set of bits selecting one memory bank within an accessed memory region if the accessed memory region has more than the one memory bank, and one bit within said most significant set of bits indicating selectively said X memory region or said Y memory region during the X or Y access; and
   memory access circuitry arranged to selectively access said memory space in response to said access address.

2. The memory circuitry according to claim 1 wherein said plurality of memory banks includes at least four memory banks, said interleaved memory region being provided in part by all of said at least four memory banks, said X memory region being provided by part of half of said at least four memory banks, and said Y memory region being provided by part of a remainder of said at least four memory banks not used by said X memory region.

3. The memory circuitry according to claim 2 wherein each of said X and Y memory regions include two memory banks and each of said interleaved memory region, said X memory region and said Y memory region has a different mapping address within said memory space indicated by some bits in said most significant set of bits of said access address.

4. The memory circuitry according to claim 1 wherein two of said least significant bits of said access address are used by the memory access circuitry in the interleaved access to identify the memory bank being accessed.

5. The memory circuitry according to claim 1 wherein one of said least significant set of bits of said access address is used together with one of said most significant set of bits of said access address to determine the memory bank to be accessed during the X or Y access.

6. The memory circuitry according to claim 4 wherein said set of least significant bits includes a set of memory bank addressing bits of immediately greater significance than the two bits used to identify the memory bank being accessed, said set of memory bank addressing bits providing an address within the memory bank being accessed.

7. The memory circuitry according to claim 1 wherein said memory access circuitry includes a plurality of multiplexing circuits, including a first multiplexing circuit selecting from said access address one or more bits to determine a memory bank to be accessed and a second multiplexing circuit for selecting other bits from said access address to determine an address within the memory bank to be accessed.

8. A method of accessing memory in a computer system comprising:

defining a plurality of memory banks forming at least part of a mapped memory space, a first part of said memory space providing an interleaved memory region formed by each of said plurality of memory banks so that data is stored in each of said plurality of memory banks within the interleaved region, a second part of said memory space providing an X memory region using only one or some of said plurality of memory banks, and a third part of said memory space providing a Y memory region using each memory bank not used in the X memory region, each of the interleaved, X and Y memory regions being separately mapped within said memory space;

generating an access address including a most significant set of bits which indicates which of the interleaved memory region, X memory region or Y memory region is to be accessed, and a least significant set of bits which includes an indication of an address within a memory bank of an accessed region, at least one of said least significant set of bits selecting one memory bank within the accessed region if the accessed region has more than one memory bank, and one of said most significant set of bits indicating selectively the X memory region or Y memory region during an X or Y access; and accessing selectively said memory space in response to said access address.

9. The method according to claim 8 wherein two memory banks are provided for each of the X and Y memory regions and four memory banks are provided for the interleaved memory region, the least significant two bits of the access address being used to select a memory bank in an interleaved memory access and the least significant bit of the least significant two bits being used together with one bit of said most significant set of bits to determine a memory bank during an X or Y memory access.

10. The method according to claim 8 wherein said least significant set of bits which include the indication of the address within the memory bank of the accessed region have a bit of greater significance during an interleaved access than during an X or Y access, thereby providing a larger range of addresses within the memory bank during the interleaved access than a range of addresses available during the X or Y access.

* * * * *

UNITED STATES PATENT AND TRADEMARK OFFICE
CERTIFICATE OF CORRECTION

PATENT NO. : 6,553,478 B1
DATED : April 22, 2003
INVENTOR(S) : Nicolas Grossier

It is certified that error appears in the above-identified patent and that said Letters Patent is hereby corrected as shown below:

<u>Title page, Item [54] and Column 1, line 1</u>
Should read -- COMPUTER MEMORY HAVING BOTH INTERLEAVED AND X-Y ACCESS --

Signed and Sealed this

Twelfth Day of August, 2003

JAMES E. ROGAN
*Director of the United States Patent and Trademark Office*